United States Patent
Alexander

(10) Patent No.: US 6,909,267 B2
(45) Date of Patent: Jun. 21, 2005

(54) LOGIC CONTROLLED HIGH VOLTAGE RESONANT SWITCHING POWER SUPPLY

(75) Inventor: William C. Alexander, Spicewood, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/327,610

(22) Filed: Dec. 20, 2002

(65) Prior Publication Data

US 2003/0160596 A1 Aug. 28, 2003

Related U.S. Application Data

(60) Provisional application No. 60/344,853, filed on Dec. 31, 2001.

(51) Int. Cl.$^7$ .................................................. G05F 1/44
(52) U.S. Cl. ...................................... 323/284; 323/288
(58) Field of Search ................................ 323/288, 222, 323/282, 283, 284

(56) References Cited

U.S. PATENT DOCUMENTS

| | | | |
|---|---|---|---|
| 4,857,822 A | * 8/1989 | Tabisz et al. | 323/282 |
| 4,945,466 A | * 7/1990 | Borland | 363/97 |
| 5,164,656 A | * 11/1992 | Gulczynski | 323/222 |
| 5,448,465 A | 9/1995 | Yoshida et al. | 363/15 |
| 5,477,131 A | 12/1995 | Gegner | 323/222 |
| 5,671,128 A | 9/1997 | Nakamura et al. | 363/16 |
| 5,715,155 A | 2/1998 | Shahani et al. | 363/132 |
| 5,736,842 A | 4/1998 | Jovanovic | 323/222 |
| 6,018,467 A | 1/2000 | Majid et al. | 363/16 |
| 6,051,963 A | 4/2000 | Eagar | 323/282 |
| 6,087,782 A | 7/2000 | Majid et al. | 315/224 |
| 6,091,234 A | * 7/2000 | Kitagawa | 323/244 |
| 6,130,825 A | 10/2000 | Imamura et al. | 363/17 |
| 6,147,881 A | 11/2000 | Lau | 363/17 |
| 6,157,179 A | 12/2000 | Miermans | 323/282 |
| 6,259,235 B1 | 7/2001 | Fraidlin et al. | 323/222 |
| 6,278,620 B1 | 8/2001 | Yasumura | 363/19 |
| 6,288,504 B1 | 9/2001 | Imamura et al. | 315/411 |
| 6,317,337 B1 | 11/2001 | Yasumura | 363/21.04 |
| 6,418,038 B2 | * 7/2002 | Takahama et al. | 363/17 |

* cited by examiner

Primary Examiner—Michael Sherry
Assistant Examiner—Gary L. Laxton
(74) Attorney, Agent, or Firm—Fulbright & Jaworski LLP

(57) ABSTRACT

Methods and apparatuses for a low EMI power supply. The power supply may include a control circuit, a power switch connected to the control circuit, an anti-parallel diode connected to the power switch, an inductor coupled to the anti-parallel diode, an output diode coupled to the inductor, and an output capacitor connected to the output diode. The power supply may include a series diode and no anti-parallel diode. The power supply provides a controllable and variable high voltage power supply from a small number of devices while, at the same time, producing low EMI. Power conversion is achieved at high efficiencies due to the recycling of energy in parasitic capacitance. Due to its low EMI, the power supply is particularly well suited for driving electronic devices such as avalanche photodiodes.

11 Claims, 2 Drawing Sheets

LOGIC CONTROLLED HIGH VOLTAGE RESONANT SWITCHING POWER SUPPLY

This application claim priority to, and incorporates by reference, U.S. Provisional Patent Application Ser. No. 60/344,853 by William C. Alexander, filed Dec. 31, 2001 and entitled, "Logic Controlled High Voltage Resonant Switching Power Supply."

BACKGROUND OF THE INVENTION

1. Field of the Invention

The present invention relates generally to the fields of power and power supplies. More particularly, it concerns methods and apparatuses for providing a controllable and variable high-voltage, logic-controlled, resonant switching power supply. Even more particularly, it concerns methods and apparatuses for providing power exhibiting low electromagnetic interference (EMI); thus, the invention may be used for driving, for example, avalanche photo diodes (APDs), which typically require high voltage but are sensitive to excess EMI.

2. Description of Related Art

The ability to provide power exhibiting low EMI is important in a wide variety of disciplines. For instance, sensor equipment such as avalanche photo diodes, medical equipment, communication equipment, and a variety of other general electronic applications may greatly benefit from utilizing low EMI power.

EMI can negatively impact communications systems and interfere with the proper operation of sensitive electronic equipment. For example, in medical applications, EMI may cause false readings and, in extreme cases, may disrupt the proper operation of life-sustaining electronic devices such as cardiac pacemakers. In the case of sensor equipment such as APDs, EMI may contribute to noise, which may disrupt readings by interfering with the measurement of the signal of interest.

As is known in the art, conventional transformers and switched-mode power supplies (SMPS) may contribute to EMI. SMPS typically operate at switching frequencies (and harmonics of those frequencies) that fall well within the frequency bands commonly allocated for communications and other devices, such as high-frequency (HF), very-high frequency (VHF), and ultra-high-frequency (UHF) bands. Consequently, their leakage signals represent a potential source of interference to consumer, commercial, and military communications services worldwide, as well as other analog and digital electronic systems such as photodiode systems, radars, and medical electronic systems that may be hindered by the interference.

Much of the noise generated by SMPS is related to the switching process itself. In its open position, an ideal switch provides infinite resistance to the flow of electrical current. In its closed position, the ideal switch offers zero resistance, allowing current flow with negligible drop in voltage. An ideal switch would control the conduction of high-speed pulsed waveforms without adding transient events or causing voltage spikes. However, real switches cannot change states instantaneously. Instead, they require transition periods known as rise and fall times. These transition periods impose distortion on the harmonic components of high-frequency SMPS waveforms. The switching process produces voltage spikes resulting in EMI and radio frequency interference (RFI) that can reach well past 100 MHz. The voltage spikes are typically caused by short-duration charging and discharging of parasitic capacitances in the power-supply circuitry.

In extreme cases where transformer or SMPS EMI levels are high, at least some of the interference may be controlled with a magnetic shielding enclosure. The enclosure surrounds the transformer, captures stray magnetic flux or radiation, and channels the unwanted energy to a ground plane. Unfortunately, such enclosures are typically bulky and add cost, weight, and manufacturing complexity to a design.

Aspects of the present disclosure may be used in conjunction with conventional apparatuses and methods relating to power supplies in general, and more particularly to switching power supplies. Below, several U.S. patents that are representative of such conventional technology are briefly discussed. Although each of these references has shown at least a degree of success in its respective application, room for significant improvement remains.

U.S. Pat. No. 5,448,465, which is hereby incorporated by reference, involves a switching power supply that supplies a regulated output voltage and suppresses spike voltage and spike current generated by a switching action of transformers. It also suppresses switching frequency drift due to load variation. A reduction of noise interference to electronic equipment and power loss in the switching power supply itself results. A series connection of a primary winding of a first transformer and a first switching means, which repeats an on/off action is connected across a DC power source. A series connection of a second switching means, which repeats an on/off action alternately with the first switching means, and a first capacitor is connected in parallel with the primary winding of the first transformer. A series connection of a primary winding of the second transformer and a second capacitor is connected in parallel with the second switching means. Regulated DC outputs are taken out from each secondary winding of the transformers through rectifiers/filters. A control circuit supplies on/off signals, which on/off-ratios are varied according to one of the regulated DC outputs, to the first and the second switching means.

U.S. Pat. No. 5,671,128, which is hereby incorporated by reference, involves a power supply apparatus in which a series circuit of first and second switching elements not blocking their reverse-directional currents is connected in parallel to a series circuit of a DC power source and a capacitor. A primary winding of a transformer is connected between a junction point of the DC power source and capacitor and a junction point of the switching elements. A secondary winding of the transformer is connected to a load circuit, and a controller is provided for controlling ON and OFF operation of the switching elements to cause a switching frequency of the switching elements to be set higher than a resonance frequency of the capacitor and an inductance of the transformer and to cause a voltage across the capacitor to increase.

U.S. Pat. No. 5,715,155, which is hereby incorporated by reference, involves a resonant switching power supply circuit that includes positive and negative DC input terminals. First and second switching elements are connected in series between the DC input terminals. Each switching element has a control input for receiving a control signal controlling a duty cycle of the switching element. A first capacitor is connected between the DC input terminals. Second and third capacitors are connected in series between the DC input terminals. A first pair of reverse biased rectifying elements in series is connected between the DC input terminals. Each rectifying element of the first pair is connected in parallel with a respective one of the switch elements. A second pair of reverse biased rectifying elements in series is connected between the DC input terminals. Each rectifying element of the second pair is connected in parallel with a respective one of the second and third capacitors. The circuit also includes a transformer including a primary winding having opposite winding ends connected between the rectifying elements of the first pair and between the rectifying elements of the second pair respectively, and a secondary winding having opposite winding ends. A pair of output terminals is connected to the winding ends of the secondary winding of the transformer respectively to supply power. The resonant switching power supply circuit can be used as a power inverter or converter.

U.S. Pat. No. 6,018,467, which is hereby incorporated by reference, involves a resonant mode power supply. It includes a DC voltage source and switching elements for alternatively connecting an oscillating circuit, including a primary winding of a transformer, to the DC voltage source and to ground. A first secondary winding supplies the main output voltage of the power supply, and a second secondary winding provides a control output voltage. An opto-coupler is included and has a light emitter connected to the second secondary winding and a light sensor connected to a controller for controlling the switching of the switching elements. The higher the frequency of the switching, the lower the power being supplied by the power supply. Burst mode stand-by is started by the first secondary winding being shunted to the second secondary winding causing the light emitter to emit a maximum amount of light. The controller increases the switching frequency until it exceeds a predetermined maximum frequency. The controller then stops the switching of the switching elements until the voltage across the light emitter falls below a predetermined value, and the controller then re-starts the switching.

U.S. Pat. No. 6,087,782, which is hereby incorporated by reference, involves a resonant mode power supply. It includes a DC voltage source and switching elements for alternatively connecting an oscillating circuit, including the primary winding of a transformer, to the DC voltage source and to ground. In order to detect faults in the load on a secondary side of the transformer which would cause the resonant mode power supply to attempt to supply and inordinate amount of power, the power on the primary side is detected. And, if this primary power exceeds a predetermined threshold value, the frequency of oscillation is increased to reduce the power. If the fault condition persists, the switching of the switching elements is discontinued.

U.S. Pat. No. 6,130,825, which is hereby incorporated by reference, involves a switching power supply. Primary-side MOS transistors are alternately turned on so that a resonant current flows into the primary winding of a transformer, and an alternate power is transferred to the secondary side. The alternate voltage generated at the secondary winding is applied by the voltage generated at the wound-up secondary winding to the gates of secondary-side MOS transistors such that they are turned on respectively in periods when the polarity of the voltage is positive. Rectified currents flow into a capacitor through a choke coil to perform synchronous rectification. If the voltage of a smoothing capacitor becomes higher than the alternate output voltage when the transformer is inverted, reverse currents flow into the secondary-side MOS transistors. With the counterelectromotive force of the choke coil, the reverse currents flowing when the transformer is inverted are suppressed, and the efficiency of the switching power supply is prevented from decreasing.

U.S. Pat. No. 6,147,881, which is hereby incorporated by reference, involves a resonant switching power supply that has a zero voltage and zero current switch feature that can be operated in a half-bridge or a full-bridge scheme. This enables power consumption to be reduced and electromagnetic radiation to be minimized, and it provides for low cost and convenient manufacture in mass production. The power supply is not influenced by parasitic capacitance and leak inductance.

U.S. Pat. No. 6,157,179, which is hereby incorporated by reference, involves a switched-mode power supply specially suitable for supplying a low output power. The switched-mode power supply periodically first charges a capacitor from an input voltage during a first period of time. It then forms a resonant circuit, including the capacitor and an inductor, to transfer the charge in the capacitor to a load via a rectifier during a second period of time.

U.S. Pat. No. 6,278,620, which is hereby incorporated by reference, involves a switching power-supply circuit comprising: rectifying and smoothing means for generating a rectified and smoothed voltage and outputting the rectified and smoothed voltage as a direct-current input voltage; an insulating converter transformer for transferring a primary-side output to a secondary side; switching means for intermittently passing on the direct-current input voltage to a primary winding of the insulating converter transformer; a primary-side resonance circuit for actuating the switching means in a voltage resonance mode; power-factor improvement means for improving a power factor by generating intermittently a rectified current based on the fed-back switching output voltage; a secondary-side resonance circuit on a secondary side of the insulating converter transformer; direct-current output voltage generation means carrying out a rectification operation in order to generate a secondary-side direct-current output voltage; and constant-voltage control means for executing constant-voltage control on the secondary-side direct-current output voltage.

U.S. Pat. No. 6,288,504, which is hereby incorporated by reference, involves a deflection current/high voltage integration type power supply that has a flyback transformer having a primary winding and a secondary winding. It includes a series circuit of a deflection coil and a first capacitor, connected in series to the primary winding of the flyback transformer; a resonance capacitor connected in parallel to the series circuit of the deflection coil and the first capacitor; a first switching element, connected in parallel with the series circuit of the deflection coil and the first capacitor, to be turned on/turned off by a drive signal so that a high voltage is generated at the secondary winding of the flyback transformer and a deflection current flows in the deflection coil; a parallel connection circuit of a second switching element and a second capacitor, connected in series to the primary winding of the flyback transformer; and a switching control means to control the deflection current flowing in the deflection coil and the high voltage generated at the secondary winding of the flyback transformer by controlling the on-timing and the off-timing of the second switching element in approximate synchronism with the drive signal.

U.S. Pat. No. 6,317,337, which is hereby incorporated by reference, involves a switching power supply circuit that has an insulated converter transformer with a gap for a loose coupling on the secondary side. A parallel resonant capacitor is connected parallel to a secondary winding, and a full-wave rectification circuit produces a secondary-side DC output voltage for increasing a maximum load power. On the primary side, an ordinary full-wave rectification circuit, rather than a voltage doubler rectifying circuit, inputs a rectified and smoothed voltage having a level corresponding to the level of an AC input voltage. A constant-voltage control circuit system for stabilizing a secondary output voltage varies a switching frequency depending on the level of the secondary output voltage to perform composite control over a resonant impedance of a primary parallel resonant circuit and a conduction angle of the switching element.

Although each of the above references exhibit advantageous qualities for its particular application, room for significant improvement remains due to the inability of conventional systems to provide a controllable and variable high voltage power supply from a small number of devices while, at the same time, producing low EMI. Relatedly, conventional systems lack the efficiency, small size, and low EMI with inherent "soft-start" exhibited by embodiments of the present invention described below. Moreover, conventional systems do not allow for operation with a single inductor, no transformer, and one power switch, in contrast to certain specific embodiments described below. Finally, conventional systems typically obtain resonance with a capacitor in series with an inductor, whereas specific embodiments herein are able to obtain resonance with parasitic capacitances in parallel with an inductor.

The referenced shortcomings of the prior art are not intended to be exhaustive, but rather are among many that tend to impair the effectiveness of previously known techniques concerning low-EMI power supplies. Other noteworthy problems may also exist; however, those mentioned here are sufficient to demonstrate that methodology appearing in the art have not been altogether satisfactory.

SUMMARY OF THE INVENTION

Shortcomings listed above are reduced or eliminated by the techniques disclosed herein. These techniques are applicable to a vast number of applications, including but not limited to applications involving APDs.

In one respect, the invention includes methods and apparatuses for a low EMI power supply. In one embodiment, the power supply includes a control circuit, a power switch connected to the control circuit, an anti-parallel diode connected to the power switch, an inductor coupled to the anti-parallel diode, an output diode coupled to the inductor, and an output capacitor connected to the output diode. In another embodiment, the power supply includes a series diode and no anti-parallel diode. The power supply provides a controllable and variable high voltage power supply from a small number of devices while, at the same time, producing low EMI. Power conversion is achieved at high efficiencies due to the recycling of energy in parasitic capacitance. Due to its low EMI, the power supply is particularly well suited for driving electronic devices such as, but not limited to, avalanche photodiodes.

In another respect, the invention is a method for reducing electromagnetic interference by using power supplies disclosed herein.

In another respect, the invention is a logic controlled high voltage resonant switching power supply that obtains resonance with parasitic capacitances in parallel with an inductor.

In another respect, the invention is a logic controlled high voltage resonant switching power supply comprising a single inductor, no transformer, and one power switch.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The present disclosure describes apparatuses and methods for providing a controllable and variable high voltage power supply from a small number of devices while, at the same time, producing low EMI. Power conversion is achieved at high efficiencies due to, in part, the recycling of energy in parasitic capacitance. Thus, the techniques described herein are advantageous for driving any device that would benefit from low EMI, including but not limited to APDs, which require high voltage but which are highly sensitive to interference and noise. With the benefit of the present disclosure, those having skill in the art will comprehend that techniques claimed herein may be modified and applied to a number of additional, different applications. The claims attached hereto cover all such modifications that fall within the scope and spirit of this disclosure.

By achieving an efficient, compact, and low noise power supply system, teachings of the present disclosure overcome shortcomings associated with the references cited above. Additionally, embodiments of the present invention overcome shortcomings of conventional schemes that employ hard switching using transformers, inductors, or capacitors. Such conventional schemes are deleterious in that they may produce high rates of change of voltage and/or current that can cause harmful EMI effects.

As compared with pulse width modulation (PWM) converters, techniques of the present disclosure achieve their efficiency, small size, and low EMI through, at least in part, inherent "soft start" properties. By "soft start," it is meant that the techniques described herein avoid current transients at start up, without requiring any additional hardware or control features.

Figure 1:
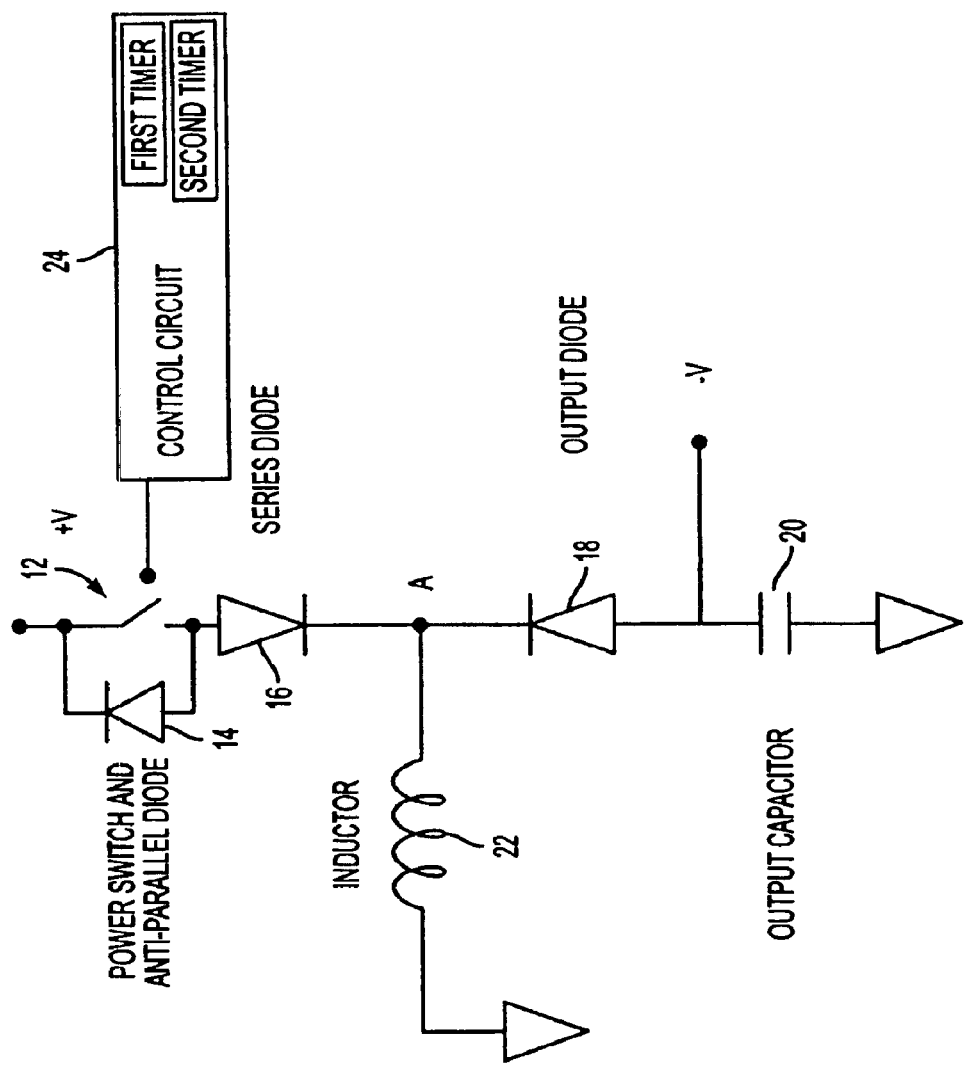
FIG. 1 is a circuit diagram of an exemplary embodiment of the present disclosure.

Turning to FIG. 1, there is shown a circuit diagram representing different embodiments of the present disclosure, as described below. FIG. 1 includes a power switch 12, an optional anti-parallel diode 14, an optional series diode 16, an output diode 18, an output capacitor 20, an inductor 22, input power, and control circuit 24.

FIG. 1 encompasses at least two distinct embodiments. A first embodiment employs the diode in anti-parallel with the power switch (anti-parallel diode 14) but does not include series diode 16 (or it is not used). A second embodiment does not employ anti-parallel diode 14 (or does not use it) but does include series diode 16. Additionally, the circuit of FIG. 1 may also be configured as a current source or as a current sink, as will be apparent to those having skill in the art.

An embodiment of FIG. 1 may be used as an APD power supply. In particular, when implemented as an APD power supply, the current source with the series diode 16 configuration may be used. In this configuration, the power switch connects or disconnects the switched sided of the inductor (illustrated as point A in FIG. 1) to a positive power supply. The low side of the inductor is connected to a ground or a negative power supply.

Series diode 16 is placed between the power switch 12 and the inductor 22 and allows current to flow only from the positive power supply. Output diode 18 is placed between the switched side of the inductor 22 and the output capacitor 20. The parasitic capacitance of the inductor 22, diodes 16 and 18, and power switch 12 react resonantly with the inductor 22, while control circuit 24 causes the power switch 12 to turn on and off in concert with this resonance characteristic.

The configuration without series diode 16, although it is topologically similar to a standard hard-switched inverting supply, employs resonant circuit operation, with soft switching, as described below.

According to embodiments of present disclosure, after power is applied to the circuit of FIG. 1, the control circuit turns on the power switch. This puts a positive voltage across inductor 22 that starts current to flow through it. After a pre-determined time period, control circuit 24 turns the power switch off. This causes the voltage at point A to fall at a rate given by the current level and the parasitic capacitance. Thus, the power switch is nominally off (zero current) well before the peak voltage is developed, thereby reducing turn-off losses and EMI.

When the voltage at point A falls below the output voltage, output diode 18 turns on, and current flows from output capacitor 20 through inductor 22. Since the voltage across inductor 22 is now reversed, the current through inductor 22 drops through zero and reverses, at which point the voltage at point A resonantly swings back positive as the current through inductor 22 charges the parasitic capacitance. This voltage becomes more positive than the power supply voltage as series diode 16 prevents reverse current flow through power switch 12.

As compared with using a diode in anti-parallel with the power switch, the use of the series diode 16 decreases the time required to reverse the current flow in inductor 22, thereby increasing the power output capability of the circuit. In some applications, this time is negligible, making it more advantageous to use the anti-parallel diode 14 instead of the series diode 16, which allows the voltage rating of the output diode 18 to be reduced.

The power switch may be turned back on during the interval when the series diode is reversed biased. This may be accomplished in various ways known in the art that either directly sense or predict this time period. With the power switch turned on at this time, there are no turn-on losses or transients, again increasing efficiency and reducing EMI. After the resonant peak is reached, the voltage at point A starts decreasing as current again begins to flow through inductor 22. When the series diode 16 becomes forward biased, current flows through the power switch 12, thereby clamping the voltage of point A at just under the power supply voltage. Current increases through inductor 22 again until the power switch 12 is turned off by the control circuit 24, and the cycle repeats.

As is better shown in FIG. 2, which is described below, control circuit 24 may sense when the current in an inductor reverses by means of a transistor that translates the current direction into a control input voltage. The control circuit may start two timers when it is sensed that the current has reversed after charging the output capacitance. The first timer may activate the power switch after a fixed amount of time which corresponds to the half-cycle period of the resonant circuit formed by the inductor and all parasitic capacitances in parallel with it. The voltage at point A is at or near its highest value at that time, so the power switch does not flow current yet. Current flow starts through it only after the power switch becomes forward biased again as the voltage at point A resonantly falls. The second timer may be variable, and it may control how long the power switch is on. The longer it is on, the higher is the current level in the inductor at turn-off, thus controlling how much power is delivered to the output. Thus, the circuit may be controlled to give a variable voltage and/or current to the output.

The following examples are included to demonstrate specific embodiments of this disclosure. It should be appreciated by those of skill in the art that the techniques disclosed in the examples that follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Figure 2:
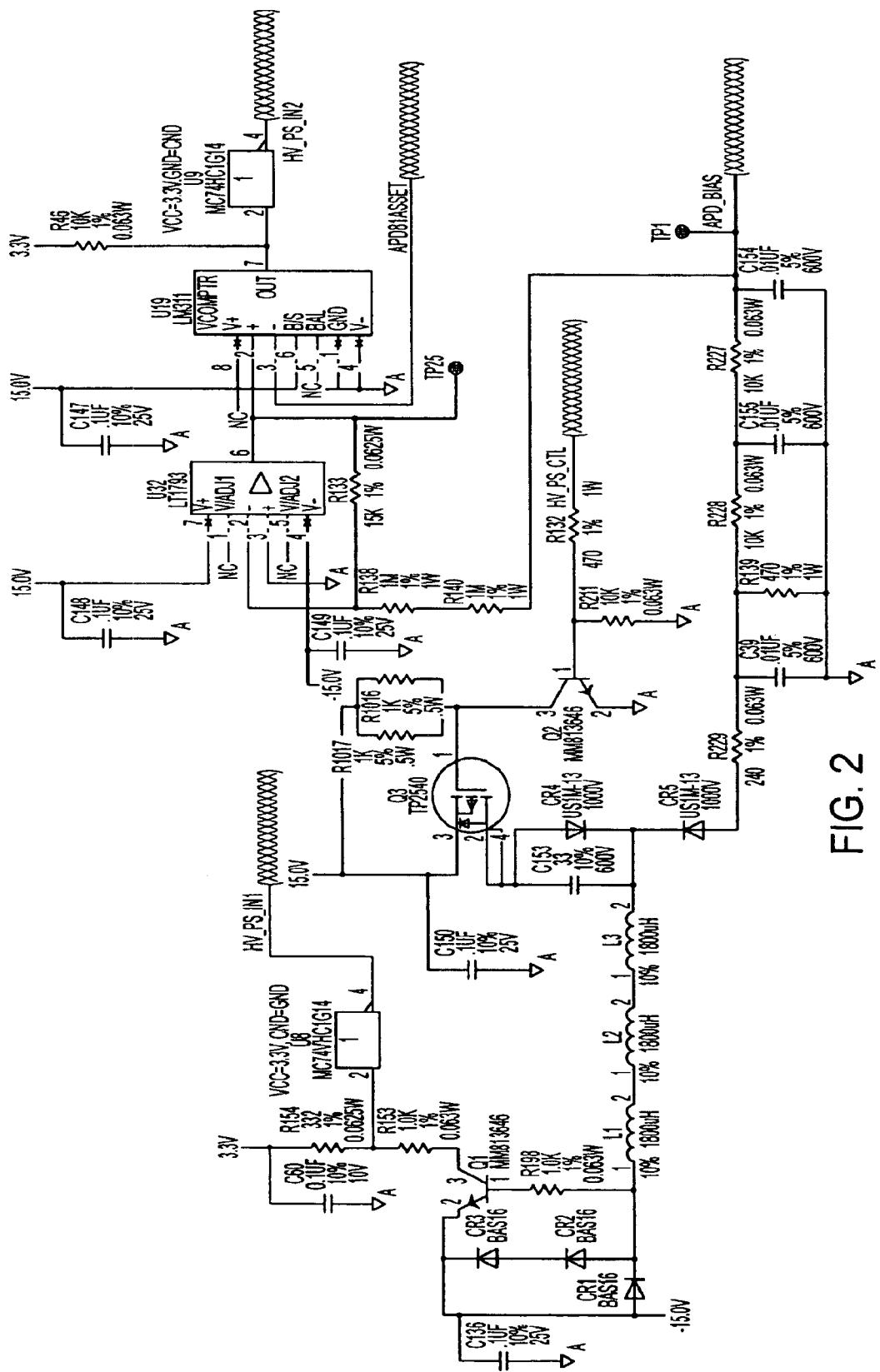
FIG. 2 is circuit diagram of a specific embodiment of the present disclosure.

Turning to FIG. 2, there is shown a circuit diagram illustrating one embodiment of a suitable power supply circuit for providing a controllable and variable high voltage power while producing low EMI.

The illustration of FIG. 2 builds upon the concepts introduced by FIG. 1 and includes circuitry showing how the inductor current is sensed and indicated to a field-programmable gate array (FPGA). It also includes circuitry showing the driving of the power switch gate. Furthermore, FIG. 2 shows circuitry for feeding-back whether or not an output voltage is above or below a set-point; however, those having ordinary skill in the art will understand that this is not necessary for the circuit to work. With the benefit of this disclosure, those having skill in the art will recognize that the circuit of FIG. 2, like other circuits, may be modified in several ways while achieving the same or similar results; for instance, it may be modified to have other means for sensing the inductor current as would be known in the art. One may also modify the circuit to sense the changing voltage at point A and to use that to control the circuit instead of the current. All such modifications that are within the realm of ordinary skill in the art, having the benefit of the description herein, are within the scope of the present disclosure.

The circuit of FIG. 2 may be described as a resonant switching power converter. Its general function is to transfer power from a low voltage to a higher voltage, using a single power switch, an inductor, two high voltage diodes, and an output filter.

Before startup, the output voltage is just above −12V, since current flows from the output filter through CRS, the inductors, and CR2 and CR3 to −12V. When reset on this logic goes low, a fixed value timer (off_time) runs down to −1, at which point Q1 is turned on by the mos_control signal going high. This causes current to start flowing from +12V, through Q1, CR4, the series inductors, and CR2 and CR3 to −12V.

Some current flows through the base of Q2, turning it on which causes the signal HV_PS_IN1 to go low. This signal is cur_sense in this logic.

Another timer (on_time) starts at the same time off time starts. When this timer gets to −1, mos_control goes low, turning off Q1. This causes the voltage at the junction of CR4 and CR5 (Vs) to drop rapidly. It falls at a finite rate due to parasitic capacitances across Q1, CR5, the inductors, and to the capacitance of C122. Vs continues to drop until CR5 is turned on by becoming forward biased.

Now current flows out of the filter, causing its voltage to drop a small amount. Due to the reverse voltage now applied across the inductors, the current rapidly drops and goes to zero. It then reverses direction.

This turns Q2 off, which causes the cur_sense signal to go high. This places the state machine back into the off1 state, where both counters count down again, repeating the process until reset goes high.

Vs now resonantly swings to a positive peak. CR4 blocks the resulting reverse voltage that would have been applied across Q1. If this were not done, that is, if the voltage were merely clamped at +12V, the resulting cycle time would be much longer, resulting in less power available from the circuit.

Off_time is timed such that it turns on Q1 just before the positive peak. This, along with C122, assures that there is no forward voltage across Q1 when it turns on. Vs then resonantly swings down below +12V, at which point Q1 conducts current to increase the inductive current until on_time counts down. The cycle repeats.

With the benefit of the present disclosure, including FIG. 1 and its accompanying description, those having skill in the art will appreciate that specific parameters of FIG. 2 (e.g., sizes of individual components) may be modified in numerous ways while still achieving the same, or similar result. All such modifications are within the scope of the present disclosure.

EXAMPLE 2

Shown below is source code, written in Very High Speed Integrated Circuit Hardware Description Language (VHDL), that is suitable for carrying out steps described herein, and particularly steps to be performed in conjunction with the embodiment of Example 1. This source code is exemplary only and does not limit the scope of the claims appended hereto. It simply represents one specific embodiment for carrying out aspects of this disclosure and is included for the convenience of the reader in this regard. Those having skill in the art, with the benefit of this disclosure, will recognize that a wide variety of computational techniques and/or different types of corresponding source code may be used in implementing concepts described herein.

```
SUBDESIGN HivoltageControl1
(
    on_count [11..0]   : INPUT;     input for on_time
    cur_sense          : INPUT;     output of schmidt trigger from
inductive current sense. Low if no current (inverted)
    mos_control        : OUTPUT;    turns Q1 on and off. High is on.
    clock              : INPUT;     100 MHz clock
    reset              : INPUT;     general reset line. Holds this
circuit off when high
)
VARIABLE
    off_time[8..0]     : DFF;       time between inductive current going
to zero (after Q1 on), and Q1 turned back on
    on_time [12..0]    : DFF;       time between inductive current going
to zero (after Q1 on), and Q1 turned off
    cur_sense_latch    : DFF;       synchronize current sense to clock
    ss: MACHINE WITH STATES (stopped, off1, on, off2);
ss: MACHINE WITH STATES (stopped, off1, on, wait, off2);
    stoppped           nothing happens, caused by a high reset
    off1               both timers counting down, Q1 off
    on                 on time continues to count down, Q1 on
    wait               only a few clocks at the most, waiting for cur_
sense to go low after Q1 turned off
    off2               waiting for the inductive current to go to zero
BEGIN
Theory of Operation of the High Voltage Generation Circuit
```

-continued

This circuit may be described as a type of resonant switching power converter. Its function is to transfer power from a low voltage to a higher voltage, using a single power switch, an inductor, two high voltage diodes, and an output filter.
Refer to the schematic. Before startup, the output voltage is just above −12V, since current flows from the output filter through CR5, the inductors, and CR2 and CR3 to −12 V.
When reset on this logic goes low, a fixed value timer (off_time) runs down to −1, at which point Q1 is turned on by the mos_control signal going high. This causes current to start flowing from +12 V, through Q1, CR4, the series inductors, and CR2 and CR3 to −12 V.
Some current flows through the base of Q2, turning it on which causes the signal HV_PS_IN1 to go low. This signal is cur_sense in this logic.
Another timer (on_time) starts at the same time off_time starts. When this timer gets to −1, mos control goes low, turning off Q1.
This causes the voltage at the junction of CR4 and CR5 (Vs) to drop rapidly.
It falls at a finite rate due to parasitic capacitances across 01, CR5, the inductors, and to the capacitance of C122. Vs continues to drop until CR5 is turned on by becoming forward biased. Now current flows out of the filter, causing its voltage to drop a small amount.
Due to the reverse voltage now applied across the inductors, the current rapidly drops and goes to zero. It then reverses direction.
This turns Q2 off, which causes the cur sense signal to go high. This places the state machine back into the off1 state, where both counters count down again, repeating the proscess until reset goes high.
Vs now resonantly swings to a positive peak. CR4 blocks the resulting reverse voltage that would have been applied across Ql. If this were not done, that is, if the voltage were merely clamped at −12 V, the resulting cycle time would be much longer, resulting in less power available from the circuit.
Off_time is timed such that it turns on Ql just before the positive peak. This, along with C122, assures that there is no forward voltage across Ql when it turns on. Vs then resonantly swings down below +12 V, at which point Ql conducts current to increase the inductive current until on_time counts down. The cycle repeats.

```
    off_time[ ].clk = clock;
    on_time[ ].clk = clock;
    cur_sense_latch.clk = clock;
    cur_sense_latch = cur_sense;
    ss.clk = clock;
    ss.reset = reset;
    CASE ss IS
        WHEN stopped =>
            mos_control = GND;
            on_time[12] = GND;
            on_time[11..0] = on_count[ ];
            off_time[ ] = H"82";    gives 1300 ns, for 1/2 period
            ss = off1;
        WHEN off1 =>              wait for resonant swing to peak
positive voltage
            mos_control = GND;
            on_time[ ] = on_time[ ] − 1;
            off_time[ ] = off_time[ ] − 1;
        IF off_time[8] THEN
            ss = on;
        ELSE
            ss = off1;
        END IF;
        WHEN on =>                now turn on Q1. The longer Q1 is
on, the more negative is the APD bias voltage
            mos_control = VCC;
            on_time[ ] = on_time[ ] − 1;
            off_time[ ] H"82";
        IF on_time[12] AND cur_sense_latch THEN  wait till current
starts if not already started
            ss = wait;
            ss = off2;
        ELSE
            ss = on;
        END IF;
deleted for now, cur_sense should already be high. If not, that means that
hi_voltage[ ] has not been set, so just go on.
        WHEN wait =>              turn off Q1, wait for it to
shut off, which makes cur_sense go low
            mos_control = GND;
        IF cur_sense THEN         wait for current to start (few 10's
```

-continued

```
of nanoseconds)
        ss = off2;
    END IF;
   WHEN off2 =>          wait for inductor current to go to
zero, which makes cur_sense go high
        mos_control = GND;
    on_time [12] =OND;
        on_time[11..0] = on_count[ ];
        off_time[ ] = H"82 ";
    IF !cur_sense latch THEN    wait for current to stop
        ss = off1;
        ELSE
            ss = off2;
    END IF;
    END CASE;
END;
```

What is claimed is:

1. A power supply, comprising:

a control circuit;

a power switch connected to the control circuit;

a diode connected in anti-parallel with the power switch;

an inductor coupled to the anti-parallel diode;

an output diode coupled to the inductor;

an output capacitor connected to the output diode;

wherein the control circuit comprises a transistor that translates a current direction into a control input voltage in order to sense when current in the inductor reverses; and wherein the control circuit comprises a first and second timer, each of which are started when current has reversed after charging an output capacitance.

2. The power supply of claim 1, wherein the first timer activates the power switch after a fixed amount of time corresponding to a half-cycle period of a resonant circuit formed by the inductor and parasitic capacitances in parallel with the inductor.

3. The power supply of claim 2, wherein the second timer is variable and controls how long the power switch remains on.

4. An electronic system, comprising the power supply of claim 1 coupled to one or more loads.

5. A method for reducing electromagnetic interference, comprising using the power supply of claim 1.

6. A power supply, comprising:

a control circuit;

a power switch connected to the control circuit;

a diode connected in series with the power switch;

an inductor coupled to the series diode;

an output diode coupled to the inductor;

an output capacitor connected to the output diode;

wherein the control circuit comprises a transistor that translates a current direction into a control input voltage in order to sense when current in the inductor reverses; and wherein the control circuit comprises a first and second timer, each of which are started when current has reversed after charging an output capacitance.

7. The power supply of claim 6, wherein the first timer activates the power switch after a fixed amount of time corresponding to a half-cycle period of a resonant circuit formed by the inductor and parasitic capacitances in parallel with the inductor.

8. The power supply of claim 7, wherein the second timer is variable and controls how long the power switch remains on.

9. An electronic system, comprising the power supply of claim 6 coupled to one or more loads.

10. The electronic system of claim 9, wherein at least one of the one or more loads comprises an avalanche photodiode.

11. A method for reducing electromagnetic interference, comprising using the power supply of claim 6.

* * * * *